(12) United States Patent
Kanou et al.

(10) Patent No.: US 10,071,725 B2
(45) Date of Patent: Sep. 11, 2018

(54) DRIVING-FORCE CONTROL DEVICE FOR VEHICLE

(71) Applicant: TOYOTA JIDOSHA KABUSHIKI KAISHA, Toyota-shi, Aichi-ken (JP)

(72) Inventors: Takeshi Kanou, Miyoshi (JP); Tomohiro Naruse, Toyokawa (JP); Yoshihide Sekiya, Chiryu (JP); Yu Yamagata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 15/228,712

(22) Filed: Aug. 4, 2016

(65) Prior Publication Data

US 2017/0036669 A1 Feb. 9, 2017

(30) Foreign Application Priority Data

Aug. 5, 2015 (JP) ................. 2015-155203

(51) Int. Cl.
*G05D 1/00* (2006.01)
*B60W 20/15* (2016.01)
(Continued)

(52) U.S. Cl.
CPC ............. *B60W 20/15* (2016.01); *B60K 6/445* (2013.01); *B60W 30/025* (2013.01);
(Continued)

(58) Field of Classification Search
CPC ............... B60W 20/15; B60W 30/025; B60W 2710/0666; B60W 2710/083; B60K 6/445; Y02T 10/6239; Y02T 10/7258
See application file for complete search history.

(56) References Cited

U.S. PATENT DOCUMENTS 6,487,998 B1  12/2002  Masberg et al.
8,260,521 B2   9/2012  Sato
(Continued)

FOREIGN PATENT DOCUMENTS

DE  4038301 A1    6/1991
DE  68918320 T2   3/1995
(Continued)

OTHER PUBLICATIONS

Feb. 1, 2018 Office Action issued in German Patent Applicaiton No. 102016114339.1.

*Primary Examiner* — Ian Jen
(74) *Attorney, Agent, or Firm* — Oliff PLC

(57) ABSTRACT

In a situation where it is predicted that a symbol of target torque reverses by turns to be positive and negative alternately, the hybrid ECU carries out an increasing correction of the target torque, in which the target torque is corrected by increasing the target torque by a set amount ΔT in a negative direction when a specific condition, in which it is judged that the degree of the vertical vibration of a vehicle body is larger than a standard value and it is judged there is no acceleration demand, is satisfied, and makes the vibration suppression control torque not to be contained in the target torque when the specific condition is not satisfied. Thereby, even when carrying out free run, the sprung vibration suppression control can be carried out during bad road running, and braking force can be suppressed and fuel consumption can be improved during good road running.

10 Claims, 7 Drawing Sheets

(51) Int. Cl.
*B60K 6/445* (2007.10)
*B60W 30/02* (2012.01)

(52) U.S. Cl.
CPC .............. *B60W 2710/0666* (2013.01); *B60W 2710/083* (2013.01); *Y02T 10/6239* (2013.01); *Y02T 10/7258* (2013.01)

(56) References Cited

U.S. PATENT DOCUMENTS

| | | |
|---|---|---|
| 8,428,845 B2 | 4/2013 | Miyazaki et al. |
| 2005/0049761 A1 | 3/2005 | Kataoka et al. |
| 2011/0213527 A1 | 9/2011 | Itabashi et al. |
| 2012/0081051 A1* | 4/2012 | Kobayashi ............... B60K 6/48 |
| | | 318/400.23 |
| 2012/0083953 A1* | 4/2012 | Izawa ................... B60W 20/40 |
| | | 701/22 |
| 2015/0123624 A1* | 5/2015 | Ookawa ................ B60W 30/02 |
| | | 322/22 |
| 2016/0229387 A1* | 8/2016 | Hata ....................... B60K 6/365 |

FOREIGN PATENT DOCUMENTS

| | | |
|---|---|---|
| DE | 19532128 A1 | 3/1997 |
| DE | 69326055 T2 | 4/2000 |
| DE | 10353692 A1 | 6/2004 |
| EP | 0338485 B1 | 9/1994 |
| EP | 0604979 B1 | 8/1999 |
| JP | 2010-125986 A | 6/2010 |
| JP | 2010-132254 A | 6/2010 |

\* cited by examiner

DRIVING-FORCE CONTROL DEVICE FOR VEHICLE

TECHNICAL FIELD

The present invention relates to a driving-force control device for a vehicle, which carries out sprung vibration suppression control (damping control) that is control in which vibration of a sprung mass of the vehicle (sprung vibration) is reduced.

BACKGROUND ART

Conventionally, sprung vibration suppression control in which sprung vibration is reduced by controlling torque of a driving source for running that drives a wheel has been known. For example, in a device proposed in the Patent Document 1 (PTL1), target torque which is obtained by adding vibration suppression control torque for suppressing vibration of a sprung mass to basic demand torque demanded for carrying out acceleration and/or deceleration of a vehicle is generated in a driving source for running. A symbol of the vibration suppression control torque alternately changes to be positive and negative, according to the vibration of the sprung mass. That is, the vibration suppression control torque changes to driving torque (positive torque) and braking torque (negative torque) by turns. For this reason, when an absolute value of the basic demand torque is small, the symbol of the target torque may change to be positive and negative in alternation. In this case, gear rattle (rattling sound) occurs when backlash of a reduction gear gets closer with a reversal of the target torque.

Therefore, in the device proposed in the Patent Document 1, when it is predicted that the symbol of target torque changes in alternation, addition of the vibration suppression control torque is forbidden. That is, sprung vibration suppression control is made not to be carried out. Thereby, an occurrence of gear rattle can be suppressed.

CITATION LIST

Patent Literature

[PTL1] The Japanese Patent Application Laid-Open "kokai" No. 2010-125986

SUMMARY OF INVENTION

The sprung vibration suppression control can be carried out by adding sprung vibration suppression controlling torque to braking torque, also while engine braking (including regenerative braking) is operating as in the case where an accelerator pedal is OFF (not stepped in). However, for example, in a case where free run (coasting) is performed by decreasing braking force, the symbol of a target torque is likely to change to be positive and negative in alternation when sprung vibration suppression control is carried out. Therefore, in the device proposed in the Patent Document 1, it becomes impossible to carry out sprung vibration suppression control while performing free run.

The present invention has been conceived in order to solve the above-mentioned problem, and one of its objectives is to enable it to properly carry out sprung vibration suppression control in a situation where there is not an acceleration demand as in the case of an accelerator pedal is OFF (not stepped in).

In order to attain the above-mentioned objective, a feature of the present invention is a driving-force control device for a vehicle, comprising:

a driving source for running (10, 11, 12), a gear mechanism (15, 16) configured to transmit output torque of said driving source for running to a wheel, a target torque calculation means (20, S55) configured to calculate target torque (T*) by adding vibration suppression control torque (Tb) required for sprung vibration suppression control to basic demand torque (Ta) demanded for carrying out acceleration and/or deceleration of the vehicle, and a driving-force control means (20, S56) configured to control the output torque of said driving source for running according to said target torque, wherein:

said driving-force control device further comprises:

a reversal predict means (S13) configured to predict a situation where a symbol of said target torque reverses to be positive and negative alternately, an acceleration demand judging means (S20) configured to judge whether an acceleration demand of said vehicle exists or not, a vibration degree judging means (S19) configured to judge whether extent of magnitude of vertical vibration of a vehicle body is larger than a standard value, and a target torque adjustment means (S23, S25, S51 to S54) configured to carry out an increasing correction of said target torque, in which said target torque is corrected by increasing said target torque by a set amount (ST) in a negative direction, when a specific condition, in which it is judged that the degree of the vertical vibration of said vehicle body is larger than the standard value and it is judged that there is no said acceleration demand, is satisfied (S20: Yes), and configured to make said vibration suppression control torque not to be contained in said basic demand torque when said specific condition is not satisfied; in a situation where it is predicted that the symbol of said target torque reverses to be positive and negative alternately.

A part of torque generated in a driving wheel is changed into force of an up-and-down direction of a vehicle body by a suspension. Therefore, vibration of a sprung mass (vibration of a vehicle body) can be suppressed by controlling this torque generated in a driving wheel. Then, in the present invention, the target torque calculation means calculates the target torque by adding the vibration suppression control torque required for sprung vibration suppression control to the basic demand torque demanded for carrying out acceleration and/or deceleration of the vehicle. The basic demand torque is driver-demand torque set based on the accelerator operation amount by a driver, for example.

The driving-force control means controls the output torque of the driving source for running according to the target torque. The output torque of the driving source for running is transmitted to a wheel (driving wheel) through the gear mechanism. Since the symbol of the vibration suppression control torque alternately changes to be positive and negative (which is referred to as a "zero cross"), according to sprung vibration, when the absolute value of the basic demand torque is small, the target torque obtained by adding the vibration suppression control torque to the basic demand torque is likely to cause the zero cross and, in that case, gear rattle (rattling sound) occurs when backlash of the gear mechanism gets closer.

Then, the driving-force control device for a vehicle, according to the present invention, comprises the reversal predict means, the acceleration demand judging means, the vibration degree judging means and the target torque adjustment means. The reversal predict means predicts a situation where the symbol of the target torque reverses to be positive and negative alternately. The acceleration demand judging means judges whether an acceleration demand of the vehicle exists or not. The vibration degree judging means judges whether the extent of the magnitude of vertical vibration of the vehicle body (sprung mass) is larger than the standard value.

The target torque adjustment means carries out an increasing correction of the target torque, in which the target torque is corrected by increasing the target torque by the set amount in the negative direction, when the specific condition, in which it is judged that the degree of the vertical vibration of the vehicle body is larger than the standard value and it is judged that there is no acceleration demand, is satisfied, in the situation where it is predicted that the symbol of the target torque reverses to be positive and negative alternately. Namely, the target torque is offset by the set amount to the negative direction. Therefore, the sprung vibration suppression control can be carried out while suppressing the zero cross of the target torque (suppressing an occurrence of the gear rattle) when the vertical vibration of the vehicle body becomes large, even in a case where free run is performed by decreasing braking torque, for example, As a technique for carrying out the increasing correction of the target torque by the set amount in the negative direction, the basic demand torque may be subjected to the increasing correction by the set amount in the negative direction, the vibration suppression control torque may be subjected to the increasing correction by the set amount in the negative direction, or initial target torque which is a sum of the basic demand torque and the vibration suppression control torque may be subjected to the increasing correction by the set amount in the negative direction.

Moreover, the target torque adjustment means makes the vibration suppression control torque not to be contained in the basic demand torque when the specific condition is not satisfied, in the situation where it is predicted that the symbol of the target torque reverses to be positive and negative alternately. For example, the vibration suppression control torque is made to be zero. Thereby, sprung vibration suppression control is forbidden and an occurrence of the gear rattle can be prevented.

For example, in a case where free run is performed, when the target torque is subjected to the increasing correction by the set amount in the negative direction, the braking torque increases accordingly and the effect of free run falls. However, in a situation where it is not judged that the degree of the vertical vibration of the vehicle body is larger than the standard value, necessity for the sprung vibration suppression control is low. Then, in a situation where it is not judged that the degree of the vertical vibration of the vehicle body is larger than the standard value, the target torque adjustment means makes the vibration suppression control torque not to be contained in the target torque, and forbids the sprung vibration suppression control. Therefore, free run can be carried out without increasing braking torque, and the effect of free run can be acquired.

Thus, in accordance with the present invention, in a situation where there is no acceleration demand, sprung vibration suppression control can be properly carried out.

A feature of one aspect of the present invention is in that: said target torque adjustment means is configured to adjust the set amount, by which said target torque is increased in a negative direction in said increasing correction, according to the magnitude of said vibration suppression control torque (S31-S33).

Although the occurrence of gear rattle can be successfully reduced when the set amount, by which the increasing correction of the target torque is carried out in the negative direction, is increased, deceleration of the vehicle becomes larger in the meanwhile. Then, in one aspect of the present invention, the target torque adjustment means adjusts the set amount, by which the increasing correction of the target torque is carried out in the negative direction, according to the magnitude of the vibration suppression control torque. Thereby, reduction of the occurrence of gear rattle and suppression of the increase in deceleration due to the offset can be sufficiently balanced. For example, it is preferable that the target torque adjustment means is configured to set the set amount, by which the increasing correction of the target torque is carried out in the negative direction, to a larger value when the magnitude of the vibration suppression control torque is large, as compared with that when the magnitude of the vibration suppression control torque is small.

A feature of one aspect of the present invention is in that: said vibration degree judging means is configured to estimate the extent of the magnitude of the vertical vibration of said vehicle body based on the magnitude of said vibration suppression control torque.

In accordance with the one aspect of the present invention, the extent of the magnitude of the vertical vibration of the vehicle body can be estimated properly.

A feature of one aspect of the present invention is in that: said vibration degree judging means is configured to acquire a kinetic state quantity of said vehicle and estimate the extent of the magnitude of the vertical vibration of said vehicle body based on said kinetic state quantity.

In accordance with the one aspect of the present invention, the extent of the magnitude of the vertical vibration of the vehicle body can be estimated properly. As the kinetic state quantity, a pitch rate, a pitch amplitude, up-and-down acceleration (acceleration in an up-and-down direction), a heave amplitude, vehicle speed, etc. can be employed, for example.

A feature of one aspect of the present invention is in that: said vibration degree judging means is configured to acquire a road state quantity of a region ahead of said vehicle of a road on which said vehicle is running and estimate the extent of the magnitude of the vertical vibration of said vehicle body based on said road state quantity.

In accordance with the one aspect of the present invention, the extent of the magnitude of the vertical vibration of the vehicle body can be estimated in advance. For example, it is preferable that the vibration degree judging means is configured to shoot (take a picture of) a scene ahead of the vehicle with a camera and analyze the shot image to acquire the road state quantity.

A feature of one aspect of the present invention is in that: said target torque adjustment means is configured to continue said increasing correction to continue said sprung vibration suppression control, unless a predetermined end permission condition is satisfied, even though a situation where the degree of the vertical vibration of said vehicle body is larger than the standard value has been switched to a situation where the degree of the vertical vibration of said vehicle body is not larger than the standard value.

In accordance with the one aspect of the present invention, even though a running condition of the vehicle is temporarily switched to good road (smooth) running in the middle of bad (rough) road running, the sprung vibration suppression control can be continued while carrying out the increasing correction of the target torque. Therefore, the offset of the target torque can be prevented from changing frequently due to a temporary change of a road surface condition. As a result of this, frequency with which a vehicle posture changes due to acceleration and/or deceleration and a sense of discomfort given to a driver due to the change of the vehicle posture can be reduced. For example, it is preferable that the end permission condition is a condition that the sprung vibration suppression control accompanied by the increasing correction of the target torque has continued for at least a certain time period or longer.

Although reference signs used in embodiments are attached in parenthesis to constituent elements of the present invention corresponding to the embodiments in the above-mentioned explanation in order to help understanding of the present invention, the constituent elements of the present invention are not limited to the embodiments specified with the above-mentioned reference signs.

DESCRIPTION OF EMBODIMENTS

Figure 1:
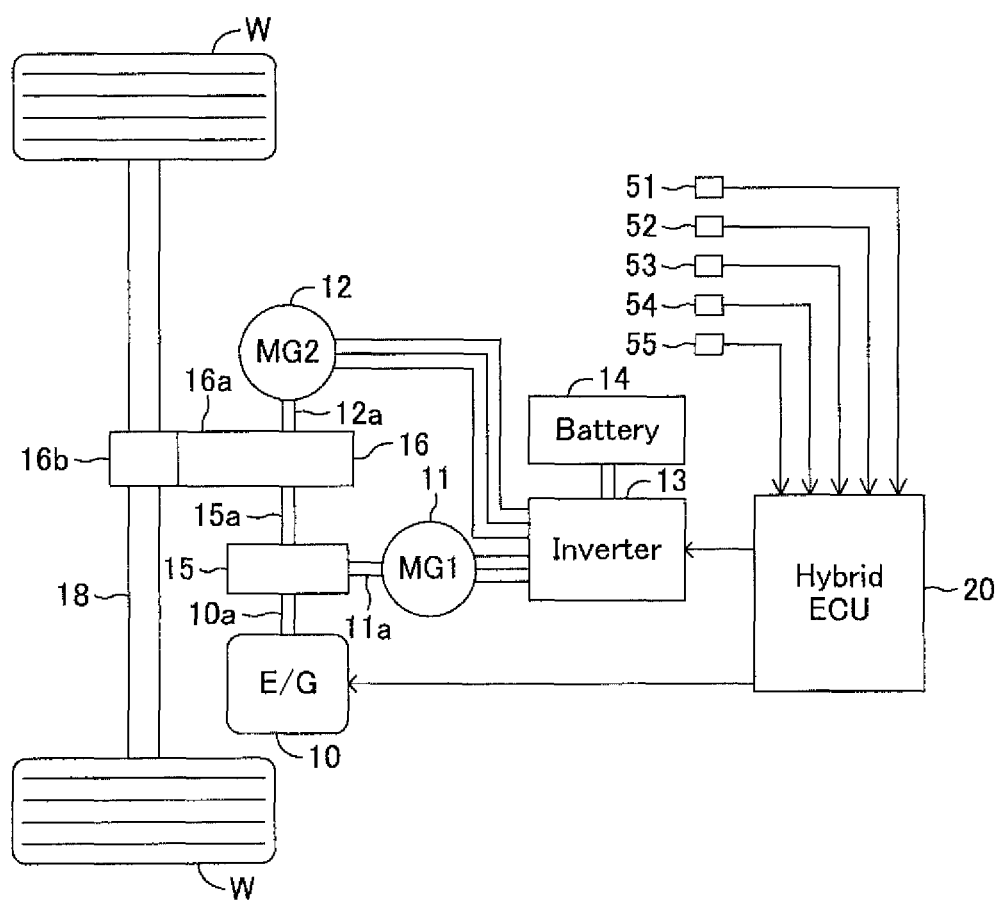
FIG. 1 is a schematic configuration diagram of a driving-force control for a vehicle, device according to the present embodiment.

Hereafter, the embodiments of the present invention will be explained in detail using drawings. FIG. 1 schematically shows the configuration of a driving-force control device for a vehicle according to the present embodiment.

A vehicle on which this driving-force control device is mounted is a hybrid vehicle. The driving-force control device comprises an engine 10, a first motor-generator 11 (referred to as a first MG11), a second motor-generator 12 (referred to as a second MG12), an inverter 13, a battery 14, a motive-power distribution mechanism 15, a driving-force transmission mechanism 16, and a hybrid ECU20. In addition, ECU is the abbreviation for Electric Control Unit. Although the vehicle on which the driving-force control device according to the present embodiment is mounted is a rear-drive vehicle, it may be a front-wheel-drive vehicle or a four-wheel-drive vehicle.

Although the engine 10 is a gasoline engine, it may be a diesel engine.

The motive-power distribution mechanism 15 distributes driving force of the engine 10 into motive power for driving its own output shaft 15a and motive power for driving the first MG11 as a dynamo (electric generator). The motive-power distribution mechanism 15 is constituted by a planetary gear mechanism which is not shown. The planetary gear mechanism comprises a sun gear, pinion gears, a planetary carrier, and a ring gear (not shown). A rotation axis of the planetary carrier is connected to a driving shaft 10a of the engine 10, and transmits motive power to the sun gear and the ring gear through the pinion gears. A rotation axis of sun gear is connected to a rotation axis 11a of the first MG11, and the first MG11 is made to generate electricity with the motive power transmitted from the sun gear. A rotation axis of a ring gear is connected to the output shaft 15a of the motive-power distribution mechanism 15.

The output shaft 15a of the motive-power distribution mechanism 15 and the rotation axis 12a of the second MG12 are connected to the driving-force transmission mechanism 16. The driving-force transmission mechanism 16 comprises a reduction-gear train 16a and a differential gear 16b, and is connected to a wheel driving shaft 18. Therefore, torque from the output shaft 15a of the motive-power distribution mechanism 15 and torque from the rotation axis 12a of the second MG12 are transmitted to right-and-left wheels W (driving wheels) through the driving-force transmission mechanism 16.

The above-mentioned motive-power distribution mechanism 15 and the driving-force transmission mechanism 16 are well-known, their configurations and operations are described, for example, in the Japanese Patent Application Laid-Open "kokai" No. 2013-177026 official report, etc., and the well-known technology can be applied to the present embodiment.

The first MG11 and the second MG12 are respectively permanent-magnet type synchronous motors, and are connected to the inverter 13. The inverter 13 comprises a first inverter circuit for driving the first MG11 and a second inverter circuit for driving the second MG12 independently. When operating the first MG11 or the second MG12 as a motor, the inverter 13 converts DC electric power supplied from the battery 14 into three-phase alternating current, and supplies the converted alternating current electric power to the first MG11 or the second MG12 independently.

Moreover, the first MG11 and the second MG12 generate electricity in a situation where the rotation axis is turned around (rotated) by external force. When operating the first MG11 or the second MG12 as a dynamo, the inverter 13 converts three-phase power-generation electric power outputted from the first MG11 or the second MG12 into DC electric power, and charges the converted DC electric power at the battery 14. Regenerative braking force can be generated at the wheels W by this charging at the battery 14 (electric-power regeneration).

The engine 10 and the inverter 13 are controlled by the hybrid ECU20. The hybrid ECU20 comprises a microcomputer as its principal part. In the present specification, a microcomputer comprises a CPU and storage device, such as a ROM and a RAM, and the CPU realizes various functions by performing an instruction (program) stored in the ROM.

The hybrid ECU20 is connected to an accelerator sensor 51 which detects an accelerator operation amount AP, various kinds of sensors which are needed for control of the engine 10 (referred to as sensors 52 for engine control) various kinds of sensors which are needed for control of the first MG11 and the second MG12 (referred to as MG control sensors 53), a vehicle speed sensor 54 which detects vehicle speed V, and an SOC sensor 55 which detects charge status (SOC: State Of Charge) of the battery 14.

The hybrid ECU20 is connected to other ECUs in the vehicle through CAN (Controller Area Network), which is not shown, so that mutual communication is possible, transmits various kinds of control information and demand signals to other ECUs in the vehicle, and receives those control information and demand signals from other ECUs in the vehicle.

Figure 2:
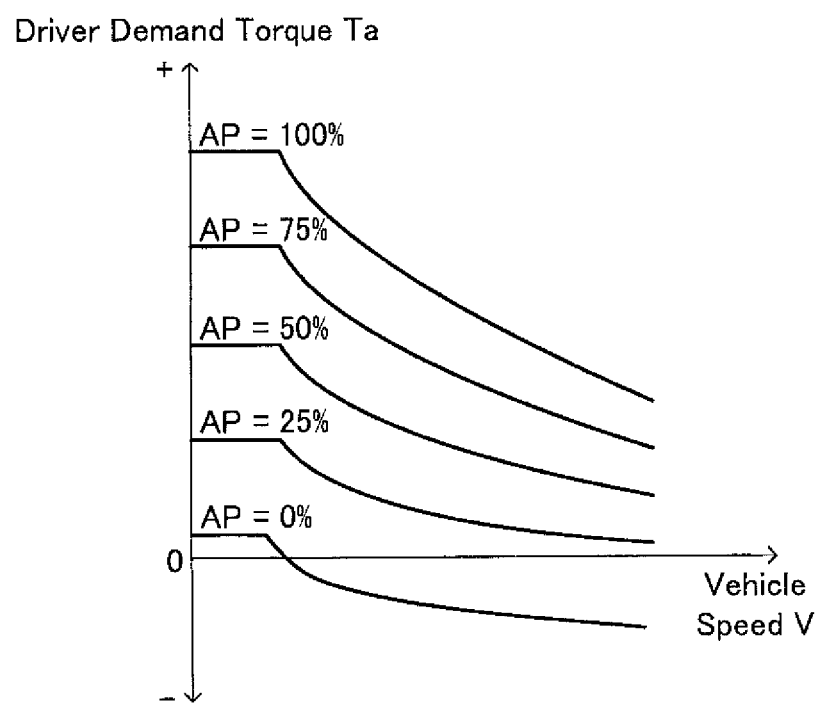
FIG. 2 is a graph for showing a driver demand torque map.

The hybrid ECU20 calculates driver demand torque Ta, with reference to the driver demand torque map shown in FIG. 2, based on the accelerator operation amount AP (accelerator opening %) and the vehicle speed V. This driver demand torque map is one example, and it has a property that the driver demand torque Ta is set to a value which increases as the accelerator opening AP becomes larger and decreases as the vehicle speed V becomes higher. The driver demand torque Ta is torque demanded for carry out acceleration and/or deceleration of the vehicle.

Moreover, the hybrid ECU20 calculates vibration suppression control torque Tb, which is torque for performing sprung vibration suppression control, and calculates target torque T* by adding the driver demand torque Ta and the vibration suppression control torque Tb (T*=Ta+Tb). This target torque T* is torque required for the wheel driving shaft 18. The driver demand torque Ta is equivalent to the basic demand torque of the present invention. The vibration suppression control torque Tb is equivalent to the vibration suppression control torque of the present invention.

The hybrid ECU20 calculates engine demand output power, first MG demand torque, and second MG demand torque, etc. in accordance with a predetermined rule, based on the target torque T*, the SOC value of the battery 14, the rotational speed of the first MG11 and the second MG12, etc. Calculation methods of such demand values are also well-known, and described in the Japanese Patent Application Laid-Open "kokai" No. 2013-177026 official report, etc., for example, and these well-known technologies can be applied to the present embodiment.

The hybrid ECU20 controls the inverter 13 based on the first MG demand torque and the second MG demand torque. Thereby, the first MG demand torque occurs in the first MG11, and the second MG demand torque occurs in the second MG12. The demand torque may be driving torque which gives driving force to the wheels W (symbol: positive), and may be braking torque which gives braking force to the wheels W (symbol: negative). The hybrid ECU20 makes wheels W generate regenerative braking force so that the vehicle slows down with deceleration set according to the vehicle speed V, when the accelerator operation amount AP (accelerator opening %) is zero and a brake operation amount BP is zero.

The hybrid ECU20 operates actuators for engine control, which is not shown, based on engine demand torque, and carries out fuel injection control, ignition control and intake air amount control. Thereby, the engine 10 is driven so that engine demand output power is generated.

The hybrid ECU20 stops the engine 10 and makes the vehicle run only with the driving torque of the second MG12 at the time of start or low-speed running of the vehicle. In this case, the first MG11 is controlled not to generate drive resistance. Therefore, the second MG12 can efficiently drive the wheels W without suffering from drag resistance.

At the time of steady running, the hybrid ECU20 distributes the driving force of the engine 10 into two lines with the motive-power distribution mechanism 15, transmits one of them to the wheels W as driving force, and transmits the other to the first MG11. Thereby, the first MG11 generates electricity. A part of this generated electric power is supplied to the battery 14. The second MG12 is driven with the electric power generated by the first MG11 and the electric power supplied from the battery 14, and assists the drive of the engine 10.

At the time of deceleration (at the time of release of an accelerator pedal, i.e., accelerator-off) and a braking operation (at the time of an operation of a brake pedal, i.e., brake-on), the hybrid ECU20 stops the engine 10, operates the second MG12 as a dynamo by rotating the second MG12 with the motive power transmitted from the wheels W, and regenerates the power-generation electric power at the battery 14. Thereby, what is called engine braking (engine braking by regeneration without using engine friction) occurs.

Moreover, the hybrid ECU20 carries out free run, when a predetermined free-run condition is satisfied. This free run is also referred to as coasting and means that a vehicle is made to run through inertia with hardly generating braking force (what is called engine braking) when a driver has released an accelerator pedal and a brake pedal. When the accelerator pedal is released, at normal time when the free-run condition is not satisfied, the hybrid ECU20 stops the engine, and operates the second MG12 as a dynamo to generate predetermined regenerative braking force. On the other hand, when the free-run condition is satisfied, the hybrid ECU20 stops the engine, and makes the regenerative braking force generated by the second MG12 to be zero or smaller as compared with the normal time to perform free run. Therefore, when carrying out free run, the driver demand torque Ta is set to zero or a small negative value.

For example, when the vehicle runs while performing the regeneration by the second MG12, the vehicle may stop short of a position that a driver wishes due to excessive braking force, and the driver may have to operate the accelerator pedal in order to adjust the stop position. In such a case, there is a possibility that fuel consumption may get worse on the contrary. On the other hand, in case of free run, since an accelerator operation is suppressed, fuel consumption can be improved.

Next, the sprung vibration suppression control carried out by the hybrid ECU20 will be explained. During the vehicle is running, when disturbance acts on a wheel due to irregularity of a road surface, etc., the disturbance is transmitted to a vehicle body through a suspension. Thereby, the vehicle body vibrates approximately at a resonance frequency of a sprung mass (for example, 1.5 Hz). This vibration is referred to as sprung vibration. The sprung vibration contains a component in an up-and-down direction at a center-of-gravity position of the vehicle (referred to as a heave vibration) and a component in a pitch direction around a right-and-left (horizontal) direction axis passing through the center of gravity of the vehicle (referred to as a pitch vibration). When the sprung vibration occurs, at least one of the heave vibration and the pitch vibration occurs. Moreover, the sprung vibration occurs also when torque outputted from a hybrid system according to an accelerator operation by a driver (torque outputted to the wheel driving shaft 18) is changed.

A part of braking force and driving force of the wheels W is converted into force in an up-and-down direction of the vehicle body by the suspension (mainly, a link mechanism). Therefore, against the sprung vibration, force in a direction which suppresses the sprung vibration can be generated in the vehicle body through the suspension by changing the output torque given to the wheels W in synchronization with the sprung vibration.

Then, the hybrid ECU20 is vibration suppression control torque for suppressing sprung vibration to driver demand torque set according to an accelerator operation by a driver, sets this added torque as target torque, and controls the output power of a hybrid system (torque outputted to the wheel driving shaft 18 by operations of the engine 10, the first MG11 and the second MG12) so that the wheels W generate the target torque.

The hybrid ECU20 computes the state variable of the sprung vibration by using a previously constructed movement model of sprung vibration. The state variable of the sprung vibration means displacement z in the up-and-down direction and displacement G in the pitch direction of the vehicle body B and their rates of change dz/dt and dθ/dt, when driver demand torque (a value converted into wheel torque of the wheels W) and an estimated value of the wheel torque at present are inputted into the movement model. The hybrid ECU20 calculates an amount of correction for correcting the driver demand torque Ta so that the state variable converges to zero. This amount of correction serves as the vibration suppression control torque Tb for suppressing sprung vibration. Therefore, sprung vibration can be suppressed by controlling the output power of the hybrid system based on target torque T* which is obtained by adding the vibration suppression control torque Tb to the driver demand torque Ta.

A calculation method of this vibration suppression control torque is not a feature of the present invention and therefore explanation thereof is omitted. For example, it is preferable to apply calculation method described in the Japanese Patent Application Laid-Open "kokai" No. 2010-132254 official report or the Japanese Patent Application Laid-Open "kokai" No. 2004-168148 official report thereto. In addition, in place of such a calculation method using a movement model, a calculation method in which an actual vertical vibration of a vehicle body is detected and vibration suppression control torque is calculated so that the detected vertical vibration is compensated may be adopted. For example, a configuration in which up-and-down acceleration of a vehicle body is detected by a sprung mass acceleration sensor and vibration suppression control torque which generates force for sprung vibration suppression is calculated based on the detected up-and-down acceleration can be employed.

The vibration suppression control torque takes a value which vibrates to a positive direction and to a negative direction centering around zero, and the larger sprung vibration becomes, the larger its amplitude becomes. Since the target torque is obtained by adding the vibration suppression control torque to the driver demand torque, symbol of the target torque reverses in alternation to be positive and negative when magnitude (absolute value) of the driver demand torque is small. That is, the target torque is reversed by turns to torque in a driving direction and torque in a braking direction. Thereby, the target torque repeats the zero cross and gear rattle occurs when backlash of gears disposed in the motive-power distribution mechanism 15 and the driving-force transmission mechanism 16 gets closer. Especially when carrying out free run, the zero cross of the target torque is likely to occur, as shown in FIG. 3 (a), since the magnitude of the driver demand torque is set to zero or a small negative value (braking torque).

Figure 3:
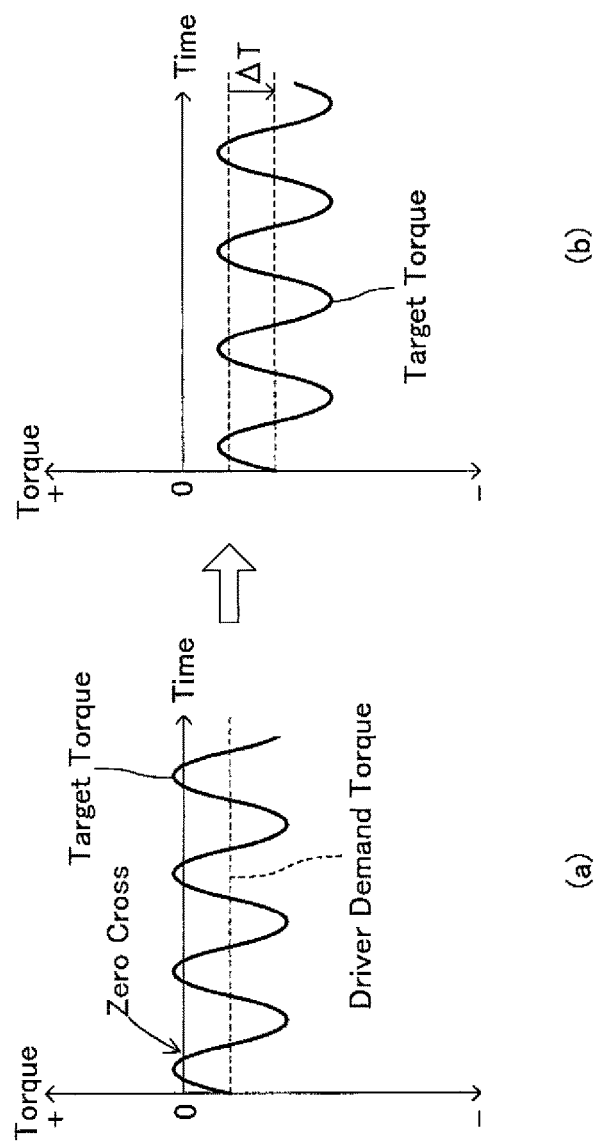
FIG. 3 is a graph for showing waveforms of target torque (a) when the target torque is not offset, and (b) when the target torque is offset.

Then, the hybrid ECU20 suppresses the target torque from causing the zero cross by adding a predetermined quantity ΔT to the driver demand torque in a direction in which the absolute value of the driver demand torque becomes larger, as shown in FIG. 3 (b). In the present embodiment, in order to suppress the zero cross of the target torque at the time of execution of free run, the driver demand torque is corrected (the predetermined quantity ΔT is added) only when the driver demand torque is not more than zero (when an acceleration demand is not carried out). In this case, the predetermined quantity ΔT becomes a negative value. Moreover, when the amplitude of the vibration suppression control torque which represents the magnitude of the vibration suppression control torque is smaller than a predetermined value, it is configured that the sprung vibration suppression control and the correction of the driver demand torque are not performed and thereby free run can be carried out with small braking force, since the necessity for sprung vibration suppression control is not so large.

Hereafter, the processing in which a predetermined quantity ΔT is added to the driver demand torque in a direction in which the absolute value of the driver demand torque becomes larger is referred to as an offset. Moreover, the target torque calculated using a value before offsetting the driver demand torque is referred to as an initial target torque. In the present embodiment, since the driver demand torque is offset when there is no acceleration demand, the predetermined quantity ΔT becomes a negative value. Therefore, the driver demand torque increases in a negative direction by the offset.

Figure 4:
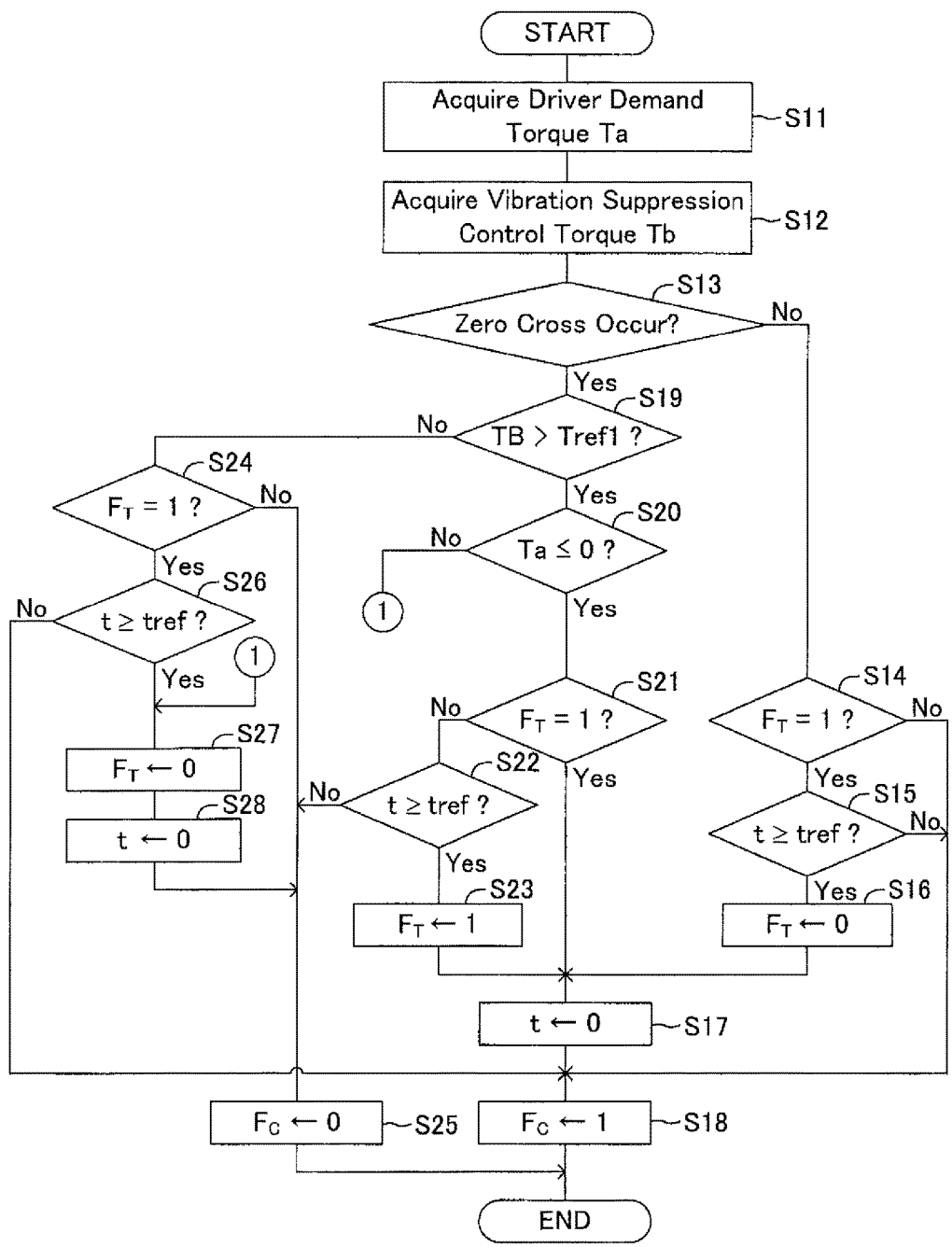
FIG. 4 is a flowchart for showing a flag setting routine.
Figure 5:
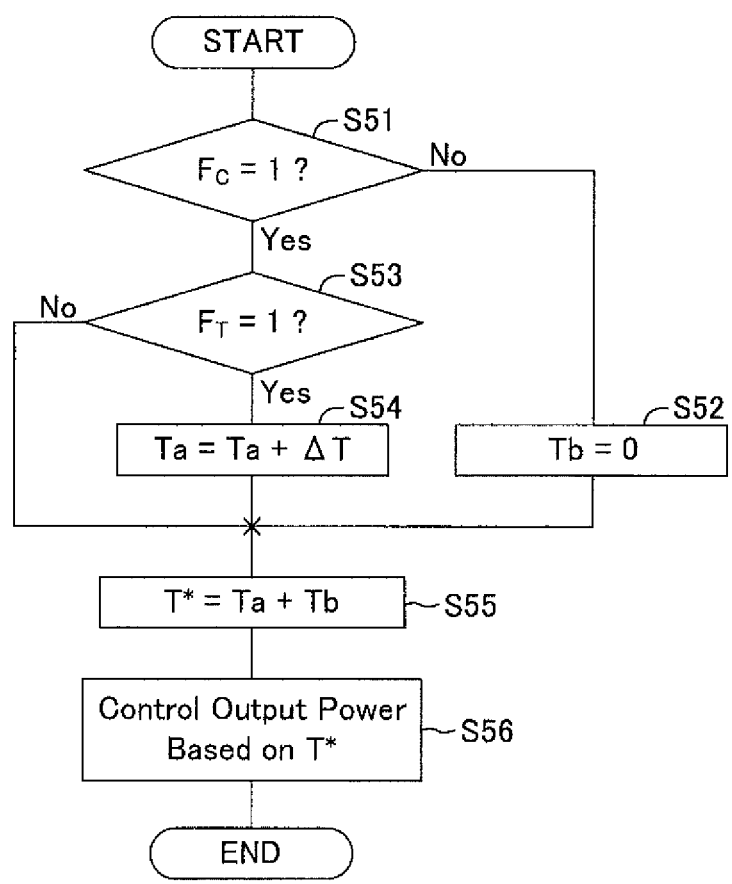
FIG. 5 is a flowchart for showing a sprung vibration suppression control routine.

Next, the sprung vibration suppression control which the hybrid ECU20 carries out will be explained. FIG. 4 shows a flag setting routine for setting a flag used for the sprung vibration suppression control. FIG. 5 shows a sprung vibration suppression control routine for calculating target torque based on the flag set by the flag setting routine. The flag setting routine and the sprung vibration suppression control routine are repeatedly carried out by the hybrid ECU20 during a time period in which an ignition switch is ON with a predetermined calculation period, respectively.

Abbreviations in both routines, including those have already been mentioned are as follows.

Ta: Driver demand torque
Tb: Vibration suppression control torque
T*: Final target torque
ΔT: An amount of increasing correction for increasing the driver demand torque to a negative direction (offset amount)
TB: An amplitude of the vibration suppression control torque Tb
Tref1: Vibration threshold value for judging magnitude of the vibration suppression control torque Tb
$F_T$: A torque increase flag which shows that it is in a state that the driver demand torque is offset by "1", and shows that it is in a state that the driver demand torque is not offset by "0"
$F_C$: A vibration suppression execution flag which shows that it is in a state that the sprung vibration suppression control is being performed by "1", and shows that it is in a state that the sprung vibration suppression control is not being performed by "0"
t: A timer value which is always incremented with a predetermined period
tref: A timer threshold value First, the flag setting routine will be explained. When the flag setting routine starts, the hybrid ECU20 acquires the driver demand torque Ta in step S11, and acquires the vibration suppression control torque Tb in step S12. The driver demand torque Ta and the vibration suppression control torque Tb are calculated with a predetermined period by another calculation routine carried out in parallel to the flag setting routine. The hybrid ECU20 reads the newest values of the driver demand torque Ta and the vibration suppression control torque Tb in these steps S11 and S12.

Subsequently, in step S13, the hybrid ECU20 predicts whether initial target torque causes the zero cross when sprung vibration suppression control is performed. In this case, the absolute value |Ta| of the driver demand torque Ta is compared with the amplitude value TB of the vibration suppression control torque Tb, and it is judged that the zero cross of the initial target torque occur when |Ta|<TB is true.

When it is predicted that the initial target torque does not cause the zero cross (S13: No), the hybrid ECU20 judges whether the torque increase flag $F_T$ is set to "1" in step S14, and judges whether the timer value t is not less than the threshold value tref in step S15 when the torque increase flag $F_T$ is set to "1." When the timer value t is not less than the threshold value tref (S15: Yes), the hybrid ECU20 switches the torque increase flag $F_T$ to "0" in step S16, and resets the timer value tin step S17. Subsequently, the hybrid ECU20 sets the vibration suppression execution flag $F_C$ to "1" in step S18. The sprung vibration suppression control is carried out by setting this vibration suppression execution flag $F_C$ to "1." In addition, the timer value t is a counter value which is incremented with a predetermined period, and cleared to zero by this reset processing in the flag setting routine.

On the other hand, when the torque increase flag $F_T$ is set to "0" (S14: No), or when the timer value t is less than the threshold value tref (S15: No), the hybrid ECU20 skips processing in the above-mentioned steps S16 and S17, advanced the processing to step S18, and sets the vibration suppression execution flag $F_C$ to "1."

Moreover, the hybrid ECU20 judges whether the amplitude TB of the vibration suppression control torque Tb is larger than the vibration threshold value Tref1 in step S19, when it is judged that the initial target torque causes the zero cross in step S13. That is, it judges whether the magnitude of the extent of the vertical vibration of the vehicle body (sprung mass) is larger than a standard value. When the amplitude TB of the vibration suppression control torque Tb is larger than the vibration threshold value Tref1, the hybrid ECU20 judges whether the driver demand torque Ta is a value of zero or less, i.e., whether it is a situation where acceleration demand is not carried out, in subsequent step S20.

In a situation where the acceleration demand is not carried out, the hybrid ECU20 judges whether the torque increase flag $F_T$ is set to "1" in step S21, and advances the processing to step S17 and resets the timer value t when the torque increase flag $F_T$ is set to "1", and sets the vibration suppression execution flag $F_C$ to "1" in step S18. On the other hand, when the torque increase flag $F_T$ is not set to "1" (S21: No), the hybrid ECU20 judges whether the timer value t is not less than the threshold value tref in step S22, switches the torque increase flag $F_T$ to "1" in step S23 when the timer value t is not less than the threshold value tref, and advances the processing to step S17 to carry out the above-mentioned processing. Moreover, when the timer value t is less than the threshold value tref (S22: No), the hybrid ECU20 advances the processing to step S25 and sets the vibration suppression execution flag $F_C$ to "0."

On the other hand, when it is judged that the amplitude TB of the vibration suppression control torque Tb is not more than the vibration threshold value Tref1 in step S19, the hybrid ECU20 judges whether the torque increase flag $F_T$ is set to "1" in step S24, and sets the vibration suppression execution flag FC to "0" in step S25 when the torque increase flag $F_T$ is set to "0" (S24: No). By setting this vibration suppression execution flag $F_C$ to "0", the sprung vibration suppression control becomes not to be carried out.

Moreover, when it is judged that the torque increase flag $F_T$ is set to "1" in step S24, the hybrid ECU20 judges whether the timer value is not less than the threshold value tref in step S26, switches the torque increase flag FT to "0" in step S27 when the timer value is not less than the threshold value tref, resets the timer value tin subsequent step S28, and advances the processing to step S25 to carry out the above-mentioned processing. Moreover, in step S20, when it is judged that it is in a situation where the acceleration demand is carried out, the hybrid ECU20 advances the processing to step S27.

After setting the vibration suppression execution flag $F_C$ in step S18 or step S25, the hybrid ECU20 once ends this routine. Then, this routine is repeated with a predetermined calculation period.

Next, the sprung vibration suppression control routine (FIG. 5) will be explained. When the sprung vibration suppression control routine starts, the hybrid ECU20 reads the vibration suppression execution flag $F_C$ set by the flag setting routine in step S51, and judges whether the vibration suppression execution flag $F_C$ is "1" or not. When the vibration suppression execution flag $F_C$ is "0" (S51: No), the hybrid ECU20 sets the vibration suppression control torque Tb, which is the amount of sprung vibration suppression control, to zero (Tb=0) in step S52.

On the other hand, when the vibration suppression execution flag $F_C$ is "1" (S51: Yes), the hybrid ECU20 judges in step S53 whether the torque increase flag $F_T$ set by the flag setting routine is "1" or not. When the torque increase flag $F_T$ is "1", the hybrid ECU20 sets a value which is obtained by adding the amount of increasing correction $\Delta T$ to the driver demand torque Ta as new driver demand torque Ta in step S54 (Ta=Ta+$\Delta T$). When the torque increase flag $F_T$ is "1", it is in a situation where there is no acceleration demand. Moreover, the amount of increasing correction $\Delta T$ is a value for correcting the driver demand torque Ta so that the absolute value of the driver demand torque Ta is increased. Therefore, the hybrid ECU20 sets a value which is obtained by adding the amount of increasing correction $\Delta T$ to the driver demand torque Ta ($\leq 0$) in the negative direction (a value which is obtained by adding a negative amount of increasing correction $\Delta T$) as new driver demand torque Ta. Thereby, the driver demand torque Ta is offset by $\Delta T$ to the negative direction. Moreover, when the torque increase flag $F_T$ is "0" (S53: No), processing in step S54 is skipped.

Subsequently, in step S55, the hybrid ECU20 computes final target torque T* by adding the driver demand torque Ta and the vibration suppression control torque Tb (T*=Ta+Tb). Subsequently, in step S56, the hybrid ECU20 controls the output power of the hybrid system to generate the target torque T*. In this case, when the driver demand torque Ta is a negative value, i.e., braking torque is demanded, the hybrid ECU20 generates the target torque T* by controlling the regenerative braking torque of the second MG12, in a state that the engine 10 has been stopped.

After carrying out the processing in step S56, the hybrid ECU20 once ends the sprung vibration suppression control routine, and carries out the sprung vibration suppression control routine repeatedly with a predetermined calculation period.

Thus, the sprung vibration suppression control which controls the vertical vibration of a sprung mass (vehicle body) is carried out by performing the flag setting routine and the sprung vibration suppression control routine in parallel.

In the flag setting routine according to the present embodiment, when it is predicted that the initial target torque which is obtained by adding the vibration suppression control torque Tb to the driver demand torque Ta does not cause the zero cross (S13: No), basically, the torque increase flag $F_T$ is set to "0", and the vibration suppression execution flag $F_C$ is set to "1." Therefore, sprung vibration suppression control is carried out without offsetting the driver demand torque Ta.

Moreover, in a case where it is predicted that the initial target torque causes the zero cross (S13: Yes), when the magnitude (amplitude TB) of the vibration suppression control torque Tb is larger than the vibration threshold value Tref1 (S19: Yes) and the acceleration demand is not carried out (S20: Yes), basically, the torque increase flag $F_T$ is set to "1" and the vibration suppression execution flag $F_C$ is set to "1." That is, when there is high need for suppressing sprung vibration and the driver has not stepped in an accelerator pedal, sprung vibration suppression control is carried out in a state where the driver demand torque Ta is offset.

At the time of execution of free run, the driver demand torque Ta is set to zero or small braking torque. For this reason, the initial target torque is likely to cause the zero cross when performing free run, but, in this embodiment, the sprung vibration suppression control can be carried out while suppressing the zero cross of a target torque (suppressing occurrence of gear rattle), since the driver demand torque Ta is offset.

Moreover, even in a case where it is predicted that the initial target torque causes the zero cross (S13: Yes), when the magnitude (amplitude) of the vibration suppression control torque is smaller than the vibration threshold value Tref1 (S19: No), basically, the torque increase flag $F_T$ is set to "0" and the vibration suppression execution flag $F_C$ is set to "0." That is, when the necessity of suppressing sprung vibration is low, the driver demand torque is not offset and the sprung vibration suppression control is not carried out. Therefore, gear rattle of gear due to the sprung vibration suppression control can be prevented from being generated. In this case, although sprung vibration is not suppressed, a discomfort feeling is not given to a driver since the extent of sprung vibration is small. Moreover, free run can be carried out without increasing braking torque, and the effect (improvement in fuel consumption) of free run is acquired.

Moreover, in a situation where the sprung vibration suppression control is needed, zero clearance of the timer value is always carried out (S17) during the sprung vibration suppression control is being carried out ($F_T$=1). Therefore, when the situation where the sprung vibration suppression control is needed is ended and changes to a situation where the sprung vibration suppression control is not needed, that is, when a running condition of the vehicle is switched from bad (rough) road running to good road (smooth) running (S19: No), the vibration suppression execution flag $F_C$ is maintained to be "1" (S26: No) and the sprung vibration suppression control is continued until a predetermined time tref has passed since the timing of switching from bad road running to good road running.

Therefore, even though a running condition of the vehicle is temporarily switched to good road running in the middle of bad road running, the sprung vibration suppression control can be continued. Moreover, the torque increase flag $F_T$ is also switched in concert with the switching of the sprung vibration suppression control. Thereby, the offset of the driver demand torque (braking torque) can be prevented from being switched frequently due to a temporary change of a road surface condition. Therefore, frequency with which a vehicle posture changes due to acceleration and/or deceleration and a sense of discomfort given to a driver due to the change of the vehicle posture can be reduced.

Moreover, in a state where acceleration is being demanded, although the zero cross of the target torque can be suppressed by the increasing correction of the driver demand torque in a positive direction, for example, acceleration of the vehicle is increased by the increased torque in a driving direction and a sense of discomfort is likely to be given to a driver. On the other hand, in the present embodiment, since the driver demand torque is offset only in a situation where there is no acceleration demand (in other words, since the offset of the driver demand torque is forbidden in a situation where there is an acceleration demand), such a problem does not occur.

<Modification 1 of Flag Setting Routine>

Figure 6:
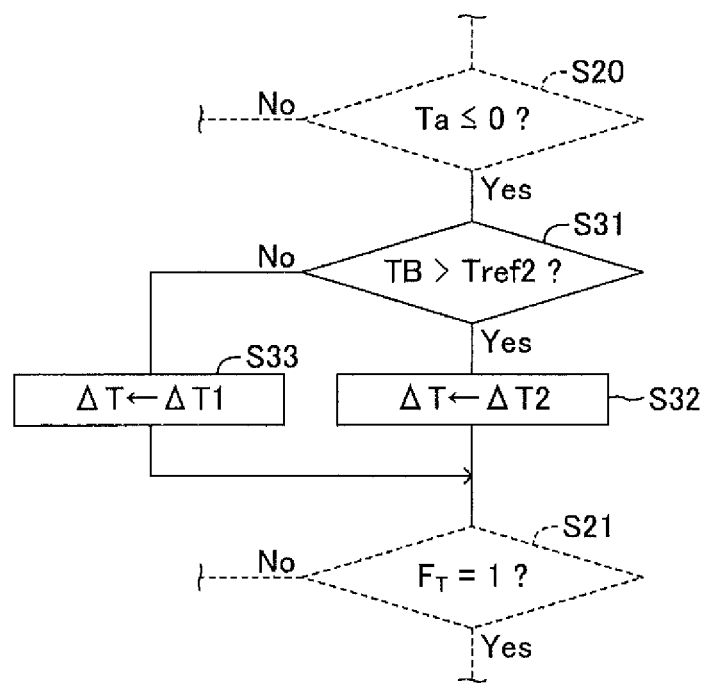
FIG. 6 is a (partial) flowchart for showing a modification 1 of the flag setting routine.

Next, a modification 1 of the flag setting routine will be explained. As shown in FIG. 6, in this modification 1, processing of steps S31 to S33 is added between step S20 and step S21 of the flag setting routine (FIG. 4) in the above-mentioned embodiment, and other processing is the same as that in the above-mentioned embodiment. In FIG. 6, the added processing is shown in a solid line, and the same processing as the above-mentioned embodiment is shown in a dashed line.

When the hybrid ECU20 judges as "Yes" in step S20, the hybrid ECU20 judges whether the amplitude TB of the vibration suppression control torque Tb is larger than a vibration threshold value Tref2 in subsequent step S31. This vibration threshold value Tref2 is set as a value larger than the vibration threshold value Tref1 used in step S19 (Tref2>Tref1). The hybrid ECU20 sets a value of the amount of increasing correction ΔT to ΔT2 in step S32 when the amplitude TB of the vibration suppression control torque Tb is larger than the vibration threshold value Tref2 (S31: Yes), and sets the value of the amount of increasing correction ΔT to ΔT1 in step S33 when the amplitude TB of the vibration suppression control torque Tb is not larger than the vibration threshold value Tref2, conversely to the above (S31: No). Here, the ΔT2 is set as a negative value with a larger absolute value than that of the ΔT1. After setting the value of the amount of increasing correction ΔT in step S32 or step S33, the hybrid ECU20 advances the processing to step S21 and performs the above-mentioned processing.

In accordance with this modification 1, when the amplitude TB of the vibration suppression control torque Tb is large, a larger amount of increasing correction ΔT is set, as compared with the case where the amplitude TB is small. Therefore, an amount of offset suitable for the amplitude TB of the vibration suppression control torque Tb can be set. Thereby, reduction of the occurrence of gear rattle and suppression of the increase in deceleration due to the offset can be sufficiently balanced.

In addition, although the amount of increasing correction ΔT is switched between two values in this example, it may be switched among a plurality of values, i.e., three or more values. Moreover, when switching the amount of increasing correction ΔT, it is preferable to gradually switch the amount of increasing correction ΔT so that the change of the deceleration of a vehicle is small, rather than switching the amount of increasing correction ΔT suddenly.

<Modification 2 of Flag Setting Routine>

Figure 7:
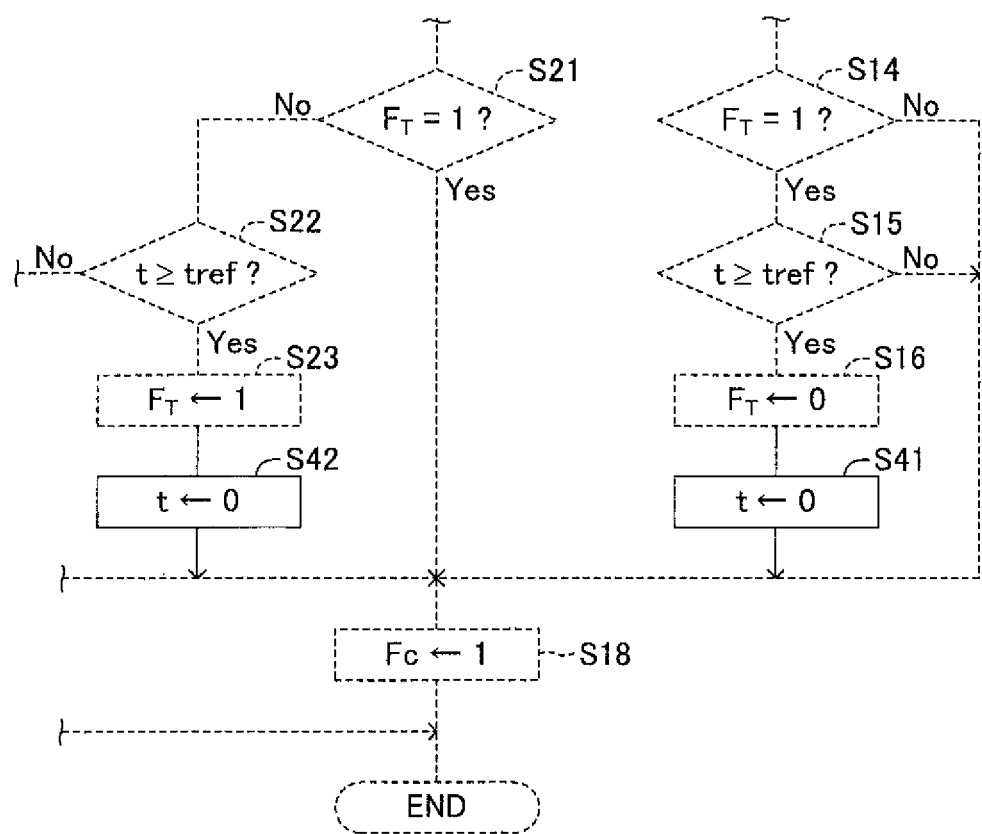
FIG. 7 is a (partial) flowchart for showing a modification 2 of the flag setting routine.

Next, a modification 2 of the flag setting routine will be explained. As shown in FIG. 7, in this modification 2, the processing of step S17 in the flag setting routine of the above-mentioned embodiment (FIG. 4) is deleted and processing of step S41 and step S42 is added, and other processing is the same as that in the above-mentioned embodiment. In FIG. 7, the added processing is shown in a solid line, and the same processing as the above-mentioned embodiment is shown in a dashed line.

After switching the torque increase flag $F_T$ to "0" in step S16, the hybrid ECU20 resets the timer value tin subsequent step S41, and advances the processing to step S18. Moreover, after switching the torque increase flag $F_T$ to "1" in step S23, the hybrid ECU20 resets the timer value tin subsequent step S42, and advances the processing to step S18.

In accordance with this modification 2, when the torque increase flag $F_T$ is switched, it is regulated so that the torque increase flag $F_T$ is not be switched until a predetermined time tref has passed since the timing of the switching. Therefore, when a vehicle goes onto a bad road and the sprung vibration suppression control is started, the sprung vibration suppression control which is performed with the driver demand torque offset comes to be continued at least for the predetermined time tref or longer. Therefore, also in this modification 2, the offset of the driver demand torque (braking torque) can be prevented from being switched frequently due to a temporary change of a road surface condition. Therefore, change of a vehicle posture due to and a sense of discomfort given to a driver due to acceleration and/or deceleration of the vehicle can be reduced.

Although driving-force control devices for a vehicle according to the present embodiment and the modifications have been explained as mentioned above, the present invention is not limited to the above-mentioned embodiment and modifications, and various modifications are possible for the present invention unless they deviate from the objective of the present invention.

For example, although it is configured so that the sprung vibration suppression control is maintained using the timer value t during the predetermined time tref even when it is changed from a situation where the sprung vibration suppression control is needed to a situation where the sprung vibration suppression control is not needed, in the present embodiment, it is not always necessary to do so, and it may be configured so that such a maintenance time period is not set. In that case, what is necessary is to delete the judgment processing of steps S15, S22 and S26 (in this case, processing is advanced as in a case where the judgment results are "Yes"), and to delete the processing of steps S17 and S28 in the flowchart of FIG. 4, for example, Moreover, although the amplitude TB of the vibration suppression control torque Tb is used as a measure for judging whether the extent of the magnitude of the vertical vibration of a vehicle body is larger than a standard value (measure for judging whether it is in a situation where the necessity of suppressing sprung vibration is high) (S19) in the present embodiment, as the above-mentioned measure, it is not always necessary to use the amplitude TB of the vibration suppression control torque Tb, and another parameters may be used.

For example, the hybrid ECU20 may acquire a kinetic state quantity (such as, a pitch rate, a pitch amplitude, up-and-down acceleration, a heave amplitude, vehicle speed, etc.) of a vehicle as the above-mentioned measure in step S19. The hybrid ECU20 may advance the processing to step S24 when the acquired kinetic state quantity of the vehicle is larger than a threshold value, and may advance the processing to step S20 when the acquired kinetic state quantity of the vehicle is not more than the threshold value.

Alternatively, the hybrid ECU20 may acquire a state quantity of a road (road state quantity) (an irregularity, a waviness in a right-and-left direction and a gradient of a road surface, etc.) of the road on which the own vehicle is running, as the above-mentioned measure, in step S19. For example, the hybrid ECU20 may analyze a shot image obtained by a stereo camera which shoots (takes a picture of) a scene ahead of a vehicle to acquire the road state quantity. The hybrid ECU20 may advance the processing to step S20 when a value of this road state quantity is on a bad road side from a bad road judging threshold value, and may advance the processing to step S24 when the value of the road state quantity is on a good side from the bad road judging threshold value.

Moreover, in the present embodiment, even though it is judged that the necessity for the sprung vibration suppression control has been lost, the sprung vibration suppression control is continued for at least a predetermined time period from a timing of the judgment. In the modification 2, when the sprung vibration suppression control is started, the sprung vibration suppression control is continued at least for a predetermined time period from a timing of the start of the sprung vibration suppression control. Although such processing in which the sprung vibration suppression control is continued for a predetermined time period or longer is carried out by a timer, the time period for which the sprung vibration suppression control is continued may be determined by capturing another event, in place of the timer.

For example, the time period for which the sprung vibration suppression control is continued may be determined by setting, as the end permission condition, a detection of a brake pedal operation, a detection of an accelerator pedal operation, or a detection of the vehicle speed V having fallen to a predetermined set vehicle speed, etc. That is, a configuration wherein the sprung vibration suppression control is continued, at least unless the above-mentioned end permission condition is satisfied, even though it is judged that the necessity for the sprung vibration suppression control has been lost, when the sprung vibration suppression control is started, may be employed.

Moreover, when the sprung vibration suppression control is suspended, a configuration wherein a time period for which sprung vibration suppression control is not carried out is secured for a predetermined time period may be added. In this case, when free run is started, free run can be continued at least for the predetermined time period regardless of a vibrational state of a sprung mass. Also in this case, the end permission condition may be set with a timer value, and a detection of a brake pedal operation, a detection of an accelerator pedal operation, or a detection of the vehicle speed V having fallen to a predetermined set vehicle speed, etc., may be set as the end permission condition.

Moreover, although the driver demand torque is offset in the negative direction by the amount of increasing correction $\Delta T$ in order to suppress the zero cross of the target torque in the present embodiment, the vibration suppression control torque may be offset in the negative direction by the amount of increasing correction $\Delta T$ (Tb=Tb+$\Delta T$) instead. Any configuration wherein the initial target torque is finally offset in the negative direction by the amount of increasing correction $\Delta T$ may be employed. Therefore, the amount of increasing correction $\Delta T$ may be added to the initial target torque which is a sum of the driver demand torque and the vibration suppression control torque.

Moreover, although the driving-force control device for a vehicle, according to the present embodiment, is applied to a hybrid vehicle, it may be also applied to a vehicle comprising only an engine or a motor-generator as a driving source for running.

REFERENCE SIGNS LIST

10: Engine, 11: First motor-generator, 12: Second motor-generator, 13: Inverter, 14: Battery, 15: Motive-power distribution mechanism, 16: Driving-force transmission mechanism, 20: Hybrid ECU, $F_C$: Vibration suppression execution flag, $F_T$: Torque increase flag, Ta:

Driver demand torque, Tb: Vibration suppression control torque, ΔT: Amount of increasing correction (offset amount).

The invention claimed is:

1. A driving-force control device for a vehicle, comprising:
   a driving source for running,
   a gear mechanism configured to transmit output torque of said driving source for running to a wheel, and
   a controller configured to act as
      a target torque calculation means configured to calculate target torque by adding vibration suppression control torque required for sprung vibration suppression control to basic demand torque demanded for carrying out acceleration and/or deceleration of the vehicle,
      a driving-force control means configured to control the output torque of said driving source for running according to said target torque,
      a reversal predict means configured to predict a situation where a symbol of said target torque reverses to be positive and negative alternately,
      an acceleration demand judging means configured to judge whether an acceleration demand of said vehicle exists or not,
      a vibration degree judging means configured to judge whether extent of magnitude of vertical vibration of a vehicle body is larger than a standard value, and
      a target torque adjustment means, wherein in a situation where the reversal predict means predicts that the symbol of the target torque reverses to be positive and negative alternately, the target torque adjustment means is configured to carry out an increasing correction of said target torque, in which said target torque is corrected by increasing said target torque by a set amount in a negative direction, when a specific condition is satisfied, wherein the specific condition is satisfied when the vibration degree judging means judges that the degree of the vertical vibration of said vehicle body is larger than the standard value and the acceleration demand judging means judges that there is no said acceleration demand, and the target torque adjustment means is further configured to make said vibration suppression control torque not to be contained in said target torque when said specific condition is not satisfied.

2. The driving-force control device for a vehicle, according to claim 1, wherein:
   said target torque adjustment means is configured to adjust the set amount, by which said target torque is increased in a negative direction in said increasing correction, according to the magnitude of said vibration suppression control torque.

3. The driving-force control device for a vehicle, according to claim 1, wherein:
   said vibration degree judging means is configured to estimate the extent of the magnitude of the vertical vibration of said vehicle body based on the magnitude of said vibration suppression control torque.

4. The driving-force control device for a vehicle, according to claim 1, wherein:
   said vibration degree judging means is configured to acquire a kinetic state quantity of said vehicle and estimate the extent of the magnitude of the vertical vibration of said vehicle body based on said kinetic state quantity.

5. The driving-force control device for a vehicle, according to claim 1, wherein:
   said vibration degree judging means is configured to acquire a road state quantity of a region ahead of said vehicle of a road on which said vehicle is running and estimate the extent of the magnitude of the vertical vibration of said vehicle body based on said road state quantity.

6. The driving-force control device for a vehicle, according to claim 1, wherein:
   said target torque adjustment means is configured to continue said increasing correction to continue said sprung vibration suppression control, unless a predetermined end permission condition is satisfied, even though a situation where the degree of the vertical vibration of said vehicle body is larger than the standard value has been switched to a situation where the degree of the vertical vibration of said vehicle body is not larger than the standard value.

7. The driving-force control device for a vehicle, according to claim 2, wherein:
   said vibration degree judging means is configured to estimate the extent of the magnitude of the vertical vibration of said vehicle body based on the magnitude of said vibration suppression control torque.

8. The driving-force control device for a vehicle, according to claim 2, wherein:
   said vibration degree judging means is configured to acquire a kinetic state quantity of said vehicle and estimate the extent of the magnitude of the vertical vibration of said vehicle body based on said kinetic state quantity.

9. The driving-force control device for a vehicle, according to claim 2, wherein:
   said vibration degree judging means is configured to acquire a road state quantity of a region ahead of said vehicle of a road on which said vehicle is running and estimate the extent of the magnitude of the vertical vibration of said vehicle body based on said road state quantity.

10. The driving-force control device for a vehicle, according to claim 2, wherein:
    said target torque adjustment means is configured to continue said increasing correction to continue said sprung vibration suppression control, unless a predetermined end permission condition is satisfied, even though a situation where the degree of the vertical vibration of said vehicle body is larger than the standard value has been switched to a situation where the degree of the vertical vibration of said vehicle body is not larger than the standard value.

* * * * *